3,469,947
ATMOSPHERE GENERATOR
Chauncey R. Drury, Sunnyvale, Calif., assignor to Whirlpool Corporation, a corporation of Delaware
Filed Jan. 12, 1965, Ser. No. 424,898
Int. Cl. B01j 7/00
U.S. Cl. 23—281                                6 Claims This invention relates to a generator for and a method of generating a carbon dioxide rich atmosphere that is useful for preserving animal and plant materials such as foods.

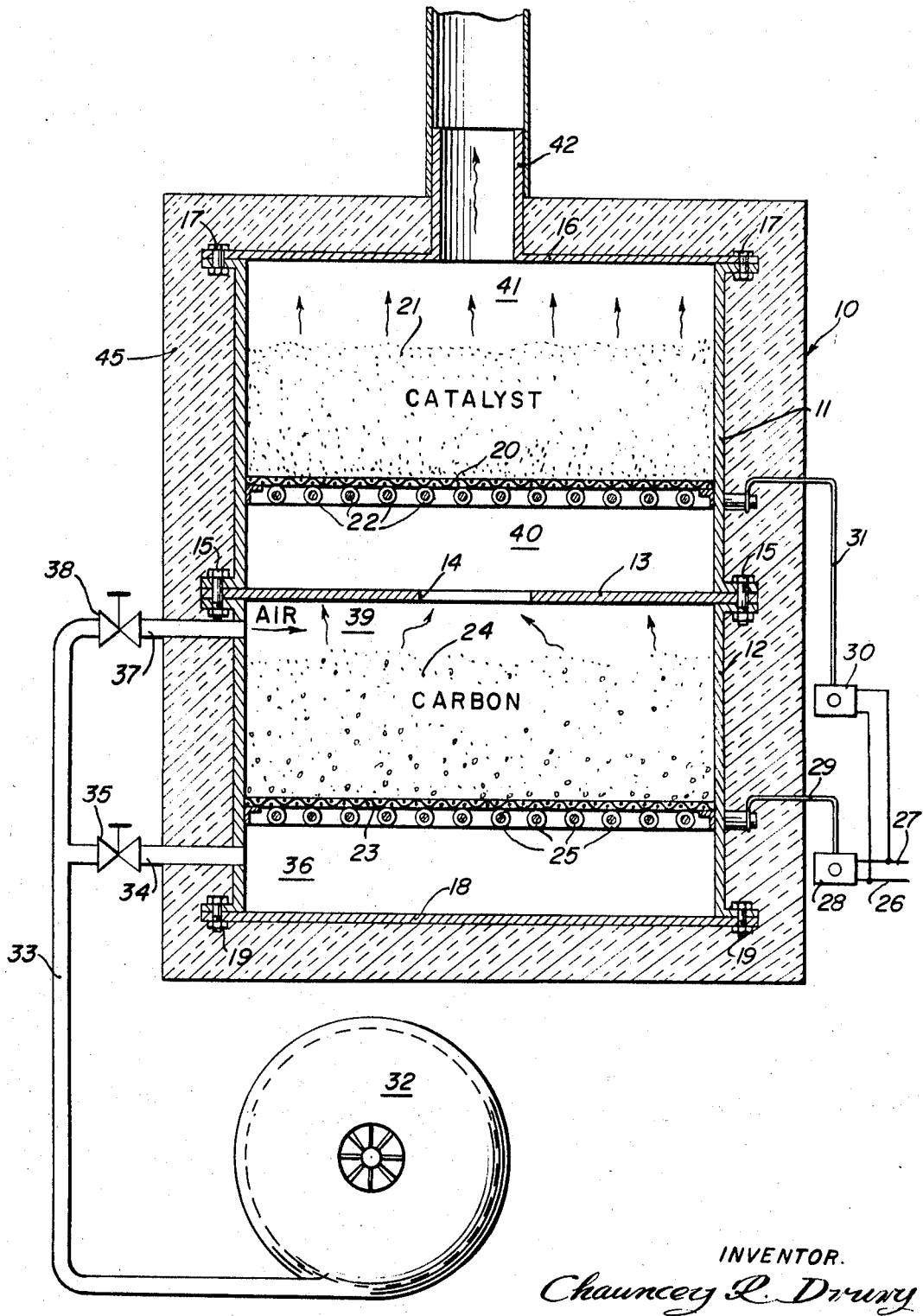

In the prior patents of Bedrosian et al. Nos. 3,102,778 and 3,102,780, assigned to the same assignee as the present application, there are disclosed apparatus and methods for preserving animal and plant materials by the use of a controlled atmosphere containing greater amounts of carbon dioxide and less amounts of oxygen than those found in ordinary air. Similarly, in the copending application of K. Bedrosian et al. Ser. No. 408,340, filed Nov. 2, 1964, there is disclosed and claimed the storing and tenderizing of meat in which an atmosphere rich in carbon dioxide but low in oxygen is used. This application likewise is assigned to the same assignee as the present application.

One of the features of this invention is to provide an improved generator and an improved method for generating an atmosphere that is rich in carbon dioxide and that may be quite low in oxygen in which a solid carbon is burned in the presence of oxygen to generate an atmosphere containing carbon dioxide and carbon monoxide, additional oxygen is added for reacting with the carbon monoxide, and then an oxidation catalyst is employed for reacting the carbon monoxide and additional oxygen, thereby producing a carbon dioxide rich atmosphere containing as small an amount of oxygen as desired.

Other features and advantages of the invention will be apparent from the following description of certain embodiments thereof taken in conjunction with the accompanying drawing. Of the drawing, the single figure of the accompanying drawing is a vertical sectional view through a generator embodying the invention with the air supply and the electrical energy supply being shown diagrammatically.

In the accompanying drawing the generator 10 comprises an upper vertical cylinder 11 arranged above a lower cylinder 12 with both being of substantially the same diameter and linearly aligned with a partition plate 13 therebetween and having a central opening 14. The cylinders 11 and 12 and the partition 13 are held in assembly by a plurality of bolts 15 extending through the edge of the partition 13 and through annular flanges on the cylinders 11 and 12.

The top of the upper cylinder 11 is closed by a plate 16 attached by bolts 17 to an upper annular flange on the cylinder 11. The bottom of the lower cylinder 12 is closed by a plate 18 similarly bolted by bolts 19 to the cylinder 12.

Positioned in the upper cylinder 11 and spaced above the partition 13 is a fluid permeable means 20, such as a heat resistant wire screen, for supporting a fluid permeable bed 21 of an oxidation catalyst. Immediately beneath the screen 20 is an electric resistance heater coil 22 for heating the catalyst bed 21 up to oxidation promoting temperature.

Arranged in the lower cylinder 12 and spaced above the bottom plate 18 is a similar fluid permeable means, such as the screen 23, for supporting a fluid permeable mass of solid carbon 24. Immediately beneath the screen 23 is a second heater coil 25 for heating the carbon mass 24 up to ignition temperature.

Electricity is supplied to the generator 10 from 115 volt lines 26 and 27. These lines lead to a switch control box 28 and from there by an electrical cable 20 to the heater 25. Electricity is also supplied to a second switch control box 30 which supplies electricity to the upper heater 22 by means of an electrical cable 31.

In order to supply air to the generator there is provided a blower 32 for forcing compressed air through an air conduit 33 from the blower. A branch conduit 34 with a valve 35 leads from the conduit 33 to the space 36 beneath the carbon screen 23 and above the bottom plate 18. A second branch conduit 37 with a valve 38 therein leads from the main conduit 33 to the space 39 beneath the partition 13 and above the carbon mass or bed 24.

The upper cylinder 11 is similarly provided with a space 40 between the upper screen 20 and the partition 13. There is also provided a space 41 between the top of the catalyst bed 21 and the top closure plate 16. This plate 16 is provided with an outlet conduit 42 leading from the upper space 41 for the outward passage of the carbon dioxide rich atmosphere generated in the generator 10.

The carbon in the mass 24 is in solid particle form so as to be readily burned and so that the combustion products and the supplied air can pass freely therethrough. The carbon is amorphous which includes vegetable and animal charcoals with an excellent source for this generator being wood charcoal. This is a relatively pure form of carbon that is freely permeable and that when burned gives off substantially no non-carbon by-products.

The catalyst in the bed 21 is of the type described in the above-mentioned Bedrosian et al. Patent 3,102,778. These are well known and commercially available and are used, for example, by the petroleum industry for hydrocarbon modification. Typical catalysts include chrome-alumina and platinum-alumina.

In order to provide adequate burning and adequate catalyzing without the formation of substantial quantities of nitrogen oxide, the carbon in the bed 24 is preferably burned at between 1200–1600° F. and the catalyst bed 21 is also preferably operated within this temperature range. In practice, it has been found that the generator works quite satisfactorily if the heaters 22 and 25 are heated to about 1200° F. before the blower 32 is operated. At these temperatures air forced from the blower 32 through the conduits 33, 34 and 37 is supplied sufficient quantity so that the carbon mass 24 burns to provide gases comprising carbon dioxide, carbon monoxide and nitrogen and other inert gases of air, while the air supplied to these gases in the space 39 reacts with the carbon monoxide in the catalyst bed 21 to oxidize substantially all of the carbon monoxide so long as sufficient additional air is supplied.

The oxygen content of the generated atmosphere leaving the generator through the conduit 42 can be controlled as to the amount of oxygen by controlling the air flow through the branch conduit 37 by means of the vave 38, for example. Where extremely low oxygen content is desired, only stoichiometric quantities of oxygen and therefore of air would be supplied to the space 39 for reacting with the carbon monoxide. This air supply is easily controlled by the valve 38 to provide the desired low oxygen content of the atmosphere flowing from the generator by way of the conduit 42. Such control is, of course, well within the knowledge of those skilled in the art.

In order to conserve heat the outer surfaces of the generator including the cylinders 11 and 12 and end closure plates 16 and 18 are surrounded by insulation 45 of the customary type.

The operation of the generator may be controlled by controlling only the operation of the blower 32. Thus, even if the carbon mass 24 is heated to oxygen reaction temperature (usually at least a red heat), no atmosphere gases will be evolved from the generator if the blower 32 is not operating. Thus, heaters 22 and 25 may be energized continually and the on and off operation of the generator controlled solely by the on and off operation of the blower 32. Alternatively, the heaters may only be energized before each "on" operation of the generator and then de-energized after ignition of the charcoal and after the catalyst bed 21 has been heated up to reaction temperature.

A typical atmosphere from the generator 10 is composed of about 20.5 volume percent carbon dioxide, about 79.3 volume percent nitrogen and only about 0.2 volume percent oxygen and 0.005 volume percent carbon monoxide. The oxygen content of the gases may of course be controlled by the amount of oxygen, preferably in the form of air, supplied to the space 39.

One of the advantages of the generator of this invention is that the generated atmosphere is in relatively pure form, as only substantially pure carbon is used in the generating of these gases. Thus, there are no hydrocarbon trace gases as occurs when hydrocarbon fuel is burned. The generator is quite compact and thus lends itself to operation in small available spaces.

Having described my invention as related to the embodiment shown in the accompanying drawing, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A generation for generating an atmosphere rich in carbon dioxide but low in oxygen, comprising: a container; means for supporting a fluid permeable mass of solid carbon in said container with a gas space above said mass and a gas space below said mass; means for initiating burning of said carbon; means for forcing air under pressure into said space below said carbon mass for upward flow through said burning mass of carbon to produce gases containing carbon dioxide, carbon monoxide and nitrogen and other inert gases of said air in said space above said mass; means for supplying additional air to said gases in said gas space above said mass to provide a mixture; means for providing a fluid permeable bed of an oxidation catalyst; means for heating said catalyst to a catalyzing temperature; and means for forcing said mixture of said gases through said oxidation catalyst bed to oxidize carbon monoxide in said gases to carbon dioxide, thereby providing said atmosphere rich in carbon dioxide but low in oxygen.

2. A generator for generating a carbon dioxide rich atmosphere, comprising: means for providing a fluid permeable mass of solid carbon; electrical means for initiating burning of said carbon; means for forcing oxygen under pressure through said burning mass of carbon to produce gases containing carbon dioxide and carbon monoxide; means for providing a fluid permeable bed of an oxidation catalyst; electrical means for heating said catalyst to a catalyzing temperature; and means for forcing a mixture of said gases and oxygen through said bed to oxidize carbon monoxide in said gases to carbon dioxide, thereby providing said carbon dioxide rich atmosphere.

3. A generator for generating a carbon dioxide rich atmosphere, comprising: a container; first fluid permeable means in said container for supporting a fluid permeable mass of solid carbon with a gas space above said mass and a gas space below said mass; electrical means for initiating burning of said carbon; second fluid permeable means in said container for supporting a fluid permeable bed of an oxidation catalyst; electrical means for heating said catalyst to a catalyzing temperature; means for forcing oxygen under pressure into said space below said carbon mass for upward flow through said mass to produce gases containing carbon dioxide and carbon monoxide in said space above said mass; and means for forcing a mixture of said gases from said space above said mass and oxygen through said bed to oxidize carbon monoxide in said gases to carbon dioxide, thereby providing said carbon dioxide rich atmosphere.

4. A generator for generating a carbon dioxide rich atmosphere, comprising: a container; first fluid permeable means in said container for supporting a fluid permeable mass of solid carbon with a gas space above said mass and a gas space below said mass; electrical means for initiating burning of said carbon; second fluid permeable means in said container for supporting a fluid permeable bed of an oxidation catalyst with a gas space above said bed and a gas space below said bed; electrical means for heating said catalyst to a catalyzing temperature; means for forcing oxygen under pressure into said space below said carbon mass for upward flow through said mass to produce gases containing carbon dioxide and carbon monoxide in said space above said mass; means for introducing oxygen to said carbon dioxide and carbon monoxide containing gases to provide a gaseous mixture; and means for forcing said mixture through said bed from said gas space below said bed, thereby providing said carbon dioxide rich atmosphere in said space above said bed.

5. The generator of claim 4 wherein said catalyst bed is arranged vertically above said carbon mass, and the space above said mass is divided from the space below said bed by a partition having gas flow means therein.

6. The generator of claim 5 wherein said gas flow means comprises means forming a substantially central opening in said partition, and said oxygen introducing means communicates with said space above said mass and beneath said partition.

References Cited

UNITED STATES PATENTS

| | | | |
|---|---|---|---|
| 556,991 | 3/1896 | Lane et al. | 23—150 |
| 1,995,274 | 3/1935 | Eversole | 23—150 |

FOREIGN PATENTS 24,652 10/1895 Great Britain.

JAMES H. TAYMAN, Jr., Primary Examiner

U.S. Cl. X.R.

13—20; 21—58; 23—288; 48—65; 219—374; 252—372